United States Patent
Puri et al.

(10) Patent No.: US 7,603,195 B2
(45) Date of Patent: *Oct. 13, 2009

(54) METHODS AND APPARATUS FOR INTEGRATING LARGE AND SMALL LOT ELECTRONIC DEVICE FABRICATION FACILITIES

(75) Inventors: Amitabh Puri, San Jose, CA (US); David Duffin, Sandy, UT (US); Eric A. Englhardt, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/555,271

(22) Filed: Oct. 31, 2006

(65) Prior Publication Data

US 2007/0061034 A1 Mar. 15, 2007

Related U.S. Application Data

(63) Continuation of application No. 10/981,131, filed on Nov. 4, 2004, now Pat. No. 7,218,983.

(60) Provisional application No. 60/518,583, filed on Nov. 6, 2003.

(51) Int. Cl.
    *G06F 19/00* (2006.01)

(52) U.S. Cl. .................. 700/112; 700/96; 700/121

(58) Field of Classification Search .............. 700/99, 700/100, 112, 113, 213, 214, 228, 121, 96; 438/14, 464; 414/222.01, 222.11, 935, 940
See application file for complete search history.

(56) References Cited

U.S. PATENT DOCUMENTS 3,845,286 A 10/1974 Aronstein et al.
(Continued)

FOREIGN PATENT DOCUMENTS

DE 19715974 A1 10/1998
(Continued)

OTHER PUBLICATIONS

Przewlocki, H. et al., "DIASTEMOS-computerized system of IC manufacturing control and diagnostics", 1990, Elektronika, vol. 31 No. 11-12, pp. 38-40, Polish Language. (Abstract only).

(Continued)

*Primary Examiner*—Charles R Kasenge
(74) *Attorney, Agent, or Firm*—Dugan & Dugan, PC

(57) ABSTRACT

In at least one aspect, the invention provides an electronic device fabrication facility (Fab) that uses small lot carriers that may be transparently integrated into an existing Fab that uses large lot carriers. A manufacturing execution system (MES) may interact with the inventive small lot Fab as if the small lot Fab is any other Fab component in an existing large lot Fab without requiring knowledge of how to control small lot Fab components (e.g., beyond specifying a processing recipe). A small lot Fab according to the present invention may encapsulate the small lot Fab's internal use of small lot components and present itself to a large lot Fab's MES as if the small lot Fab is a component that uses large lot carriers.

13 Claims, 5 Drawing Sheets

U.S. PATENT DOCUMENTS

| | | | |
|---|---|---|---|
| 3,952,388 A | 4/1976 | Hasegawa et al. | |
| 4,027,246 A | 5/1977 | Caccoma et al. | |
| 4,049,123 A | 9/1977 | Fegley et al. | |
| 4,166,527 A | 9/1979 | Beezer | |
| 4,722,659 A | 2/1988 | Hoyt et al. | |
| 4,852,717 A | 8/1989 | Ross et al. | |
| 4,892,761 A | 1/1990 | Yamada | |
| 4,936,734 A | 6/1990 | Osada | |
| 4,966,094 A | 10/1990 | Yamada | |
| 4,974,166 A | 11/1990 | Maney et al. | |
| 5,064,337 A | 11/1991 | Asakawa et al. | |
| 5,183,378 A | 2/1993 | Asano et al. | |
| 5,191,908 A | 3/1993 | Hiroe et al. | |
| 5,256,204 A | 10/1993 | Wu | |
| 5,269,643 A | 12/1993 | Kodama et al. | |
| 5,372,471 A | 12/1994 | Wu | |
| 5,382,127 A | 1/1995 | Garric et al. | |
| 5,388,945 A | 2/1995 | Garric et al. | |
| 5,390,785 A | 2/1995 | Garric et al. | |
| 5,411,358 A | 5/1995 | Garric et al. | |
| 5,544,350 A | 8/1996 | Hung et al. | |
| 5,562,383 A | 10/1996 | Iwai et al. | |
| 5,570,990 A | 11/1996 | Bonora et al. | |
| 5,612,886 A | 3/1997 | Weng | |
| 5,668,056 A | 9/1997 | Wu et al. | |
| 5,696,689 A | 12/1997 | Okumura et al. | |
| 5,751,581 A | 5/1998 | Tau et al. | |
| 5,811,211 A | 9/1998 | Tanaka et al. | |
| 5,818,716 A | 10/1998 | Chin et al. | |
| 5,825,650 A | 10/1998 | Wang | |
| 5,884,392 A | 3/1999 | Lafond | |
| 5,888,042 A | 3/1999 | Oda | |
| 5,957,648 A | 9/1999 | Bachrach | |
| 5,971,585 A | 10/1999 | Dangat et al. | |
| 5,976,199 A | 11/1999 | Wu et al. | |
| 5,980,183 A | 11/1999 | Fosnight | |
| 6,009,890 A | 1/2000 | Kaneko et al. | |
| 6,026,561 A | 2/2000 | Lafond | |
| 6,039,316 A | 3/2000 | Jackson et al. | |
| 6,048,259 A | 4/2000 | Asai | |
| 6,050,768 A | 4/2000 | Iwasaki et al. | |
| 6,053,688 A * | 4/2000 | Cheng | 414/939 |
| 6,053,983 A | 4/2000 | Saeki et al. | |
| 6,074,443 A | 6/2000 | Venkatesh et al. | |
| 6,082,948 A | 7/2000 | Fishkin et al. | |
| 6,128,588 A | 10/2000 | Chacon | |
| 6,134,482 A | 10/2000 | Iwasaki | |
| 6,144,926 A | 11/2000 | Ishizawa et al. | |
| 6,183,186 B1 | 2/2001 | Howells et al. | |
| 6,196,001 B1 | 3/2001 | Tannous et al. | |
| 6,240,335 B1 | 5/2001 | Wehrung et al. | |
| 6,256,550 B1 | 7/2001 | Wu et al. | |
| 6,303,398 B1 | 10/2001 | Goerigk | |
| 6,351,686 B1 | 2/2002 | Iwasaki et al. | |
| 6,411,859 B1 | 6/2002 | Conboy et al. | |
| 6,415,260 B1 | 7/2002 | Yang et al. | |
| 6,431,814 B1 | 8/2002 | Christensen et al. | |
| 6,439,822 B1 | 8/2002 | Kimura et al. | |
| 6,463,350 B2 | 10/2002 | Fukuda et al. | |
| 6,526,329 B2 | 2/2003 | Tateyama et al. | |
| 6,540,466 B2 * | 4/2003 | Bachrach | 414/940 |
| 6,540,467 B1 * | 4/2003 | Zohni et al. | 414/940 |
| 6,579,052 B1 | 6/2003 | Bonora et al. | |
| 6,580,967 B2 | 6/2003 | Jevtic et al. | |
| 6,587,744 B1 | 7/2003 | Stoddard et al. | |
| 6,599,670 B2 | 7/2003 | Ikuno et al. | |
| 6,640,148 B1 | 10/2003 | Miller et al. | |
| 6,641,350 B2 | 11/2003 | Nakashima et al. | |
| 6,662,076 B1 | 12/2003 | Conboy et al. | |
| 6,673,638 B1 | 1/2004 | Bendik et al. | |
| 6,675,066 B2 | 1/2004 | Moshgbar | |
| 6,684,124 B2 | 1/2004 | Schedel et al. | |
| 6,702,099 B2 | 3/2004 | Otaguro et al. | |
| 6,715,602 B1 | 4/2004 | Gartland | |
| 6,715,978 B2 | 4/2004 | Lin et al. | |
| 6,745,093 B1 | 6/2004 | Kawano et al. | |
| 6,769,855 B2 | 8/2004 | Yokomori et al. | |
| 6,788,996 B2 * | 9/2004 | Shimizu | 700/213 |
| 6,830,651 B2 * | 12/2004 | Obikane | 414/935 |
| 6,839,603 B2 | 1/2005 | Karasawa | |
| 6,853,876 B2 | 2/2005 | Wehrung et al. | |
| 6,854,583 B1 | 2/2005 | Horn | |
| 6,863,485 B2 | 3/2005 | Mizokawa et al. | |
| 6,873,963 B1 | 3/2005 | Westbury et al. | |
| 6,917,844 B2 | 7/2005 | Kawano et al. | |
| 6,943,047 B2 | 9/2005 | Yanagisawa et al. | |
| 6,971,500 B2 | 12/2005 | Horn | |
| 7,039,495 B1 | 5/2006 | Conboy et al. | |
| 7,051,870 B2 | 5/2006 | Schoendienst et al. | |
| 7,072,730 B2 | 7/2006 | Kobayashi et al. | |
| 7,077,264 B2 | 7/2006 | Rice et al. | |
| 7,137,874 B1 * | 11/2006 | Bovio et al. | 451/41 |
| 7,156,221 B2 | 1/2007 | Rice et al. | |
| 7,177,716 B2 | 2/2007 | Duffin | |
| 7,218,983 B2 * | 5/2007 | Puri et al. | 700/112 |
| 7,234,584 B2 | 6/2007 | Rice et al. | |
| 7,243,003 B2 | 7/2007 | Rice et al. | |
| 7,274,971 B2 | 9/2007 | Brill | |
| 7,283,890 B2 * | 10/2007 | Iijima et al. | 700/228 |
| 7,413,069 B2 | 8/2008 | Brill | |
| 2001/0038783 A1 | 11/2001 | Nakashima et al. | |
| 2001/0051837 A1 | 12/2001 | Tateyama et al. | |
| 2002/0071744 A1 * | 6/2002 | Bachrach | 414/940 |
| 2002/0081181 A1 | 6/2002 | Yokomori et al. | |
| 2002/0094588 A1 | 7/2002 | Fan et al. | |
| 2002/0114684 A1 | 8/2002 | Jeong et al. | |
| 2002/0116086 A1 | 8/2002 | Huber et al. | |
| 2002/0144654 A1 | 10/2002 | Elger | |
| 2002/0150447 A1 | 10/2002 | Mizokawa et al. | |
| 2002/0150448 A1 | 10/2002 | Mizokawa et al. | |
| 2002/0155705 A1 * | 10/2002 | Shimizu | 438/662 |
| 2002/0182040 A1 | 12/2002 | Kimura et al. | |
| 2002/0192055 A1 | 12/2002 | Kobayachi et al. | |
| 2002/0198623 A1 | 12/2002 | Jevtic et al. | |
| 2003/0108407 A1 | 6/2003 | Ogata et al. | |
| 2003/0113190 A1 * | 6/2003 | Bachrach | 414/217 |
| 2003/0202866 A1 | 10/2003 | Weng et al. | |
| 2004/0049398 A1 | 3/2004 | Gartland et al. | |
| 2004/0062633 A1 | 4/2004 | Rice et al. | |
| 2004/0081538 A1 | 4/2004 | Rice et al. | |
| 2004/0187342 A1 | 9/2004 | Izuta | |
| 2004/0193300 A1 | 9/2004 | Rice et al. | |
| 2004/0225393 A1 | 11/2004 | Kawano et al. | |
| 2004/0249494 A1 | 12/2004 | Kobayashi et al. | |
| 2004/0262132 A1 | 12/2004 | Pauley et al. | |
| 2005/0036856 A1 | 2/2005 | Yamashita | |
| 2005/0071043 A1 | 3/2005 | Jevtic et al. | |
| 2005/0096775 A1 | 5/2005 | Wang et al. | |
| 2005/0096782 A1 * | 5/2005 | Chen et al. | 700/224 |
| 2005/0209721 A1 | 9/2005 | Teferra et al. | |
| 2005/0232734 A1 | 10/2005 | Elliott et al. | |
| 2005/0273191 A1 | 12/2005 | Englhardt et al. | |
| 2006/0190118 A1 | 8/2006 | Teferra et al. | |
| 2007/0059861 A1 | 3/2007 | Rice et al. | |
| 2007/0061034 A1 | 3/2007 | Puri et al. | |
| 2007/0276531 A1 | 11/2007 | Teferra et al. | |
| 2007/0276532 A1 | 11/2007 | Teferra et al. | |
| 2008/0219816 A1 | 9/2008 | Rice et al. | |

FOREIGN PATENT DOCUMENTS

| | | |
|---|---|---|
| EP | 0 365 589 B1 | 9/1992 |
| EP | 0 663 686 A1 | 7/1995 |
| EP | 0 850 720 A1 | 7/1998 |

| | | |
|---|---|---|
| EP | 1128246 A2 | 8/2001 |
| EP | 1 164 437 A2 | 12/2001 |
| JP | 55091839 A | 7/1980 |
| JP | 58028860 A | 2/1983 |
| JP | 60049623 A | 3/1985 |
| JP | 63234511 | 9/1988 |
| JP | 01181156 A | 7/1989 |
| JP | 01257549 A | 10/1989 |
| JP | 02015647 A | 1/1990 |
| JP | 05128131 A | 5/1993 |
| JP | 05290053 A | 11/1993 |
| JP | 06132696 | 5/1994 |
| JP | 06260545 A | 9/1994 |
| JP | 08249044 A | 9/1996 |
| JP | 09115817 A | 5/1997 |
| JP | 10135096 A | 5/1998 |
| JP | 11176717 A | 7/1999 |
| JP | 11296208 A | 10/1999 |
| JP | 2000012646 A2 | 1/2000 |
| JP | 01332464 A | 11/2001 |
| JP | 03007584 A | 1/2003 |
| TW | 452564 | 9/2001 |
| TW | 553877 | 9/2003 |
| TW | 565519 | 12/2003 |
| WO | WO 99/28952 A2 | 6/1999 |
| WO | WO 03/058706 | 7/2003 |
| WO | WO 03/058706 A1 * | 7/2003 |
| WO | WO 2005/006408 A1 | 1/2005 |
| WO | WO 2006/081519 | 8/2006 |

OTHER PUBLICATIONS

Lovell, A. M. et al., "Cell automation: integrating manufacturing with robotics", Dec. 1990, Solid State Technology, vol. 33 No. 12, p. 37-9.

Prasad, K., "A generic computer simulation model to characterize photolithography manufacturing area in an IC FAB facility", Sep. 1991, IEEE Transactions on Components, Hybrids, and Manufacturing Technology, vol. 14 No. 3, p. 483-7.

Ehteshami, B. et al., "Trade-offs in cycle time management: hot lots", May 1992, IEEE Transactions on Semiconductor Manufacturing, vol. 5 No. 2, p. 101-6.

Lou, S. et al., "Using simulation to test the robustness of various existing production control policies", 1991, 1991 Winter Simulation Conference Proceedings, IEEE, p. 261-9.

Berg, R. et al., "The formula: world class manufacturing for hybrid thin-film component production", 1992, IEEE/SEMI International Semiconductor Manufacturing Science Symposium, pp. 53-60.

Naguib, H., "The implementation of total quality management in a semiconductor manufacturing operation", 1992, IEEE/SEMI International Semiconductor Manufacturing Science Symposium, p. 63-7.

Rose, D., "Productivity enhancement", 1992, IEEE/SEMI International Semiconductor Manufacturing Science Symposium, p. 68.

Narayanan, S. et al., "Object-oriented simulation to support operator decision making in semiconductor manufacturing", 1992, 1992 IEEE International Conference on Systems, Man and Cybernetics, vol. 2, p. 1510-15.

Leonovich, G. A. et al., "Integrated cost and productivity learning in CMOS semiconductor manufacturing", Jan.-Mar. 1995, IBM Journal of Research and Development, vol. 39 No. 1-2, p. 201-13.

Leonovich, G., "An approach for optimizing WIP/cycle time/output in a semiconductor fabricator", 1994, Sixteenth IEEE/CPMT International Electronics Manufacturing Technology Symposium. 'Low-Cost Manufacturing Technologies for Tomorrow's Global Economy'. Proceedings 1994 IEMT Symposium, vol. 1, p. 108-11.

Schomig, A. K. et al., "Performance modelling of pull manufacturing systems with batch servers", 1995, Proceedings 1995 INRIA/IEEE Symposium on Emerging Technologies and Factory Automation. ETFA '95, vol. 3, p. 175-83.

Juba, R. C. et al., "Production improvements using a forward scheduler", 1996, Seventeenth IEEE/CPMT International Electronics Manufacturing Technology Symposium 'Manufacturing Technologies—Present and Future', p. 205-9.

Fuller, L. F. et al., "Improving manufacturing performance at the Rochester Institute of Technology integrated circuit factory", 1995, IEEE/SEMI 1995 Advanced Semiconductor Manufacturing Conference and Workshop. Theme—Semiconductor Manufacturing: Economic Solutions for the 21st Century. ASMC '95 Proceedings, p. 350-5.

Houmin, Yan et al., "Testing the robustness of two-boundary control policies in semiconductor manufacturing", May 1996, IEEE Transactions on Semiconductor Manufacturing, vol. 9 No. 2, p. 285-8.

Lopez, M. J. et al., "Performance models of systems of multiple cluster tools", 1996, Nineteenth IEEE/CPMT International Electronics Manufacturing Technology Symposium. Proceedings 1996 IEMT Symposium, pp. 57-65.

Collins, D. W. et al., "Implementation of Minimum Inventory Variability Scheduling 1-Step Ahead Policy(R) in a large semiconductor manufacturing facility", 1997, 1997 IEEE 6th International Conference on Emerging Technologies and Factory Automation Proceedings, pp. 497-504.

Labanowski, L., "Improving overall fabricator performance using the continuous improvement methodology", 1997, 1997 IEEE/SEMI Advanced Semiconductor Manufacturing Conference and Workshop. Theme—The Quest for Semiconductor Manufacturing Excellence: Leading the Charge into the 21st Century. ASMC Proceedings, p. 405-9.

Dudde, R. et al., "Flexible data registration and automation in semiconductor production", 1997, Proceedings of the SPIE—The International Society for Optical Engineering, p. 171-81.

Padillo, J. M. et al., "A strategic domain: IE in the semiconductor industry", Mar. 1998, IIE Solutions, pp. 36-40, 42.

Collins, D. W. et al., "Investigation of minimum inventory variability scheduling policies in a large semiconductor manufacturing facility", 1997, Proceedings of the 1997 American Control Conference, vol. 3, p. 1924-8.

Rose, O., "WIP evolution of a semiconductor factory after a bottleneck workcenter breakdown", 1998, 1998 Winter Simulation Conference. Proceedings, vol. 2, pp. 997-1003.

Iriuchijima, K. et al., "WIP allocation planning for semiconductor factories", 1998, Proceedings of the 37th IEEE Conference on Decision and Control, vol. 3, p. 2716-21.

Weiss, M., "New twists on 300 mm fab design and layout", Jul. 1999, Semiconductor International, vol. 22 No. 8, pp. 103-4, 106, 108.

Van Antwerp, K. et al., "Improving work-in-progress visibility with active product tags YASIC manufacture", Oct. 1999, Micro, vol. 17 No. 9, pp. 67-9, 72-3.

Martin, D. P., "Total operational efficiency (TOE): the determination of two capacity and cycle time components and their relationship to productivity improvements in a semiconductor manufacturing line", 1999, 10th Annual IEEE/SEMI. Advanced Semiconductor Manufacturing Conference and Workshop. ASMC 99 Proceedings, pp. 37-41.

Martin, D. P., "Capacity and cycle time-throughput understanding system (CAC-TUS) an analysis tool to determine the components of capacity and cycle time in a semiconductor manufacturing line", 1999, 10th Annual IEEE/SEMI. Advanced Semiconductor Manufacturing Conference and Workshop. ASMC 99 Proceedings, p. 127-31.

Marcoux, P. et al., "Determining capacity loss from operational and technical deployment practices in a semiconductor manufacturing line", 1999, 1999 IEEE International Symposium on Semiconductor Manufacturing Conference Proceedings, p. 3-5.

Chen, J. C. et al., "Capacity planning for a twin fab", 1999, 1999 IEEE International Symposium on Semiconductor Manufacturing Conference Proceedings, p. 317-20.

Wei Jun-Hu et al., "Optimization methodology in simulation-based scheduling for semiconductor manufacturing", Oct. 2000, Information and Control, vol. 29 No. 5, p. 425-30, Chinese language. (Abstract only).

Hughlett, E., "Incremental levels of automation in the compound semiconductor fab", Aug. 2001, Compound Semiconductor, vol. 7 No. 7, p. 69-73.

Sarin, S. C. et al., "Reduction of average cycle time at a wafer fabrication facility", 2001, 2001 GaAs MANTECH Conference. Digest of Papers, p. 241-6.

Saito, K. et al., "A simulation study on periodical priority dispatching of WIP for product-mix fabrication", 2002, 13th Annual IEEE/SEMI Advanced Semiconductor Manufacturing Conference. Advancing the Science and Technology of Semiconductor Manufacturing. ASMC 2002, p. 33-7.

Wang, J. et al., "The improvement of automated material handling system traffic control", 2002, 2002 Semiconductor Manufacturing Technology Workshop, p. 271-4.

Wei Jie Lee, "Optimize WIP scale through simulation approach with WIP, turn-over rate and cycle time regression analysis in semiconductor fabrication", 2002, 2002 Semiconductor Manufacturing Technology Workshop, p. 299-301.

Young Hoon Lee et al., "Push-pull production planning of the re-entrant process", 2003, International Journal of Advanced Manufacturing Technology, vol. 22 No. 11-12, p. 922-31.

Garlid, Scott C., "From philosophy to reality. Interpreting the rules of JIT for IC manufacturing", 1989, SME Technical Paper (Series) MS. Publ by SME, p. 797.

Anon, "Wafer level automation", Jan. 1995, European Semiconductor, vol. 17 No. 1, p. 2.

Anon, "Coming of fab-wide automation", May 1998, European Semiconductor Design Production Assembly, vol. 20 No. 5, p. 21-22.

Pierce, Neal G. et al., "Dynamic dispatch and graphical monitoring system", 1999, IEEE International Symposium on Semiconductor Manufacturing Conference, Proceedings 1999, p. 65-68.

Nagesh, Sukhi et al., "Intelligent second-generation MES solutions for 300mm fabs", 2000, Solid State Technology, vol. 43 No. 6, pp. 133-134, 136, 138.

"300mm single-wafer transport", Jul. 1999, Solid State Technology—semiconductor manufacturing and wafer fabrication, Semicon West '99 Product Spotlight, p. 5.

"300mm single-wafer handling", Apr. 2000, Solild State Technology, Product News, <www.sold-state.com>, p. 99.

Griessing, Juergen et al., "Assessing the feasibility of a 300-mm test and monitor wafer handeling and logistics system", Jul. 2000, Micro: The 300-mm Imperative, pp. 1-19.

"The Leading Company in Micro environment", Jan. 3, 2002, Incam Solutions Company, pp. 1-2.

"Improved wafer isolation and additional flexibility", Jan. 3, 2002, Incam Solutions Company SWIF technology, pp. 1-2.

"SEMI standards compliance" and "Related SEMI standards", Jan. 3, 2002, Incam Solutions Related standards, p. 1.

"Single Wafer Lots Solution", Jan. 3, 2002, Incam Solutions References, p. 1.

Partial European Search Report of European Patent Application No. 05004338.9 (8812-02/EPC) issued on Dec. 12, 2007.

International Search Report of International Application No. PCT/US2006/003130 (8812-03-PCT) mailed Oct. 24, 2006.

Written Opinion of International Application No. PCT/US2006/003130 (8812-03-PCT) mailed Oct. 24, 2006.

Office Action and Search Report of Taiwan Application No. 094106144 (8812-02-TAI) issued Dec. 8, 2008.

International Preliminary Report on Patentability of International Application No. PCT/US2006/003130 (8812-03- PCT) mailed Aug. 09, 2007.

* cited by examiner

METHODS AND APPARATUS FOR INTEGRATING LARGE AND SMALL LOT ELECTRONIC DEVICE FABRICATION FACILITIES

This application is a continuation of and claims priority to U.S. patent application Ser. No. 10/981,131, filed Nov. 4, 2004 now U.S. Pat. No. 7,218,983 and entitled "Method And Apparatus For Integrating Large And Small Lot Electronic Device Fabrication Facilities" which claims priority to U.S. Provisional Patent Application Ser. No. 60/518,583 filed Nov. 6, 2003 and entitled "Single Wafer Software Integration". Each of these applications is hereby incorporated herein by reference in its entirety for all purposes.

RELATED APPLICATIONS

The present application is related to the following commonly-assigned, co-pending U.S. Patent Applications, each of which is hereby incorporated herein by reference in its entirety for all purposes:

U.S. patent application Ser. No. 10/650,310, filed Aug. 28, 2003 and titled "System For Transporting Substrate Carriers";

U.S. patent application Ser. No. 10/764,982, filed Jan. 26, 2004 and titled "Methods and Apparatus for Transporting Substrate Carriers"; and U.S. patent application Ser. No. 10/650,480, filed Aug. 28, 2003 and titled "Substrate Carrier Handler That Unloads Substrate Carriers Directly From a Moving Conveyor".

FIELD OF THE INVENTION

The present invention relates generally to electronic device manufacturing, and more specifically to the integration of large and small lot electronic device fabrication facilities.

BACKGROUND

A manufacturing execution system (hereinafter "MES") tracks material (e.g., substrate lots and carriers) and its associated process flow (e.g., sequence of process steps) within an electronic device fabrication facility (hereinafter "Fab"). The MES also tracks the state of the resources in the Fab that are used in the processing of substrate lots or carriers (e.g., the state of tools, storage devices, transport equipment, robots, etc.). Each time processing of the substrates in a lot or carrier completes a certain processing step (e.g., processing at a particular tool), the MES is informed of this status and determines the next destination for the carrier based on a set of operating rules that is typically Fab specific. For example, the MES may interact with a dispatcher or a scheduler to determine a tool that can perform the next process step on the substrates in the carrier, or a storage location if no such tool is available. Once a destination of the carrier has been determined, the MES sends a request to material control software (hereinafter "MCS") to move the carrier from its current location to the determined destination. The MES also sends information and commands to the tools of the Fab, instructing each tool how to process the lot of substrates in each carrier that is delivered to the tool. This process continues until the lot of substrates in the carrier has completed all steps in its process flow.

The MCS is responsible for the transportation of carriers, using automated or manual delivery systems, from one location to the next within the Fab. This software tracks the carriers that are within the domain of the MCS (e.g., in storage stockers, on delivery vehicles, etc.) and determines the best route, based on the state of delivery systems, that should be used to transport each carrier from one location to the next. The MCS acts on (e.g., executes) carrier move requests from the MES, and informs the MES when these requests have been completed.

The majority of Fabs designed to manufacture electronic devices on 200 and/or 300 mm sized semiconductor wafers currently operate with twenty-five substrate lots, (e.g., the carriers used to transport the substrates to the tools of a Fab typically will store twenty-five substrates). Thus, the various equipment (e.g., process tools, metrology tools, etc. used to process the substrates and material handling equipment used to transport and store the carriers) and software (MES, MCS, schedulers/dispatcher, cell controllers, etc.) suppliers typically design their products to achieve optimal throughput under these conditions (e.g., approximately twenty-five substrates in a carrier).

However, the majority of the substrate processing and metrology tools in conventional Fabs process substrates one at a time, even though the substrates are transported and delivered in carriers as a lot of twenty-five substrates. Accordingly, a substrate transported in a carrier has to wait until all the other substrates transported in the carrier are processed at a tool before the substrate can be transported to the next process step. This waiting time leads to a longer cycle time for each substrate processed in a Fab and a higher work-in-progress (WIP) inventory in the Fab. The above problem may further compound with longer substrate processing times when performing individual process steps at process or metrology tools.

Systems and methods that reduce the extended cycle times of prior art systems are desirable.

SUMMARY OF THE INVENTION

In a first aspect of the invention, a system is provided that includes a large lot carrier transport system adapted to deliver large lot carriers to large lot tools and a composite tool adapted to receive large lot carriers from the large lot carrier transport system. The composite tool includes a mechanism for transferring substrates from large lot carriers to small lot carriers and a small lot carrier transport system adapted to deliver small lot carriers to small lot tools.

In a second aspect of the invention, an electronic device fabrication facility is provided that includes a large lot fabrication facility including large lot components, a manufacturing execution system adapted to control the large lot fabrication facility, and a small lot sub-fabrication facility disposed within the large lot fabrication facility and adapted to interact with the manufacturing execution system of the large lot fabrication facility as a large lot component.

In a third aspect of the invention, an electronic device fabrication facility is provided that includes a large lot fabrication facility including large lot components, a small lot sub-fabrication facility disposed within the large lot fabrication facility and including small lot components, and a central manufacturing execution system. The central manufacturing execution system includes a module adapted to control the large lot fabrication facility and a module adapted to control the small lot sub-fabrication facility.

In a fourth aspect of the invention, a composite tool is provided that includes small lot components and a small lot manufacturing execution system adapted to control the small lot components. The small lot manufacturing execution system is further adapted to communicate with a large lot manufacturing execution system such that the large lot manufacturing execution system interacts with the composite tool as if the composite tool is a large lot tool.

In a fifth aspect of the invention, software for controlling an electronic device fabrication facility is provided that includes four modules. The first module is adapted to control a large lot carrier transport system of a fabrication facility that is operable to deliver large lot carriers to large lot tools. The second module is adapted to control a composite tool of the fabrication facility that is operable to receive large lot carriers from a large lot carrier transport system. The third module is adapted to control a mechanism of the fabrication facility that is operable to transfer substrates from large lot carriers to small lot carriers. The fourth module is adapted to control a small lot carrier transport system of the fabrication facility that is operable to deliver small lot carriers to small lot tools.

In a sixth aspect of the invention, a method is provided that includes partitioning computer integrated manufacturing (CIM) software for a electronic device fabrication facility (Fab). The CIM software allows the Fab to be modeled as a composite of a large lot carrier transport system, large lot tools adapted to receive large lot carriers, and a composite tool adapted to receive large lot carriers. The composite tool includes a small lot carrier transport system and tools adapted to receive small lot carriers. The method also includes executing the CIM software on a distributed platform.

In a seventh aspect of the invention, a method is provided that includes partitioning CIM software for a Fab. The CIM allows the Fab to be modeled as a composite of a large lot carrier transport system adapted to deliver large lot carriers to large lot tools and a composite tool adapted to receive large lot carriers from a large lot carrier transport system. The composite tool includes a mechanism for transferring substrates from large lot carriers to small lot carriers and a small lot carrier transport system adapted to deliver small lot carriers to small lot tools. The method also includes executing the CIM software on a distributed platform.

Numerous other aspects are provided, as are apparatus, systems and computer program products in accordance with these and other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

Aspects of the present invention overcome the drawbacks of the prior art by providing a Fab that uses small lot sized carriers (hereinafter referred to as a "small lot Fab") that may be transparently integrated into an existing Fab that uses large lot sized carriers (hereinafter referred to as a "large lot Fab"). As used herein, the term "small lot size" carrier or "small lot" carrier may refer to a carrier that is adapted to hold fewer substrates than a conventional "large lot size" carrier which typically holds thirteen or twenty-five substrates. As an example, a small lot size carrier may be adapted to hold five or less substrates. In some embodiments, other small lot size carriers may be employed (e.g., small lot size carriers that hold one, two, three, four or more than five substrates, but less than that of a large lot size carrier). In general, each small lot size carrier may hold too few substrates for human transport of carriers to be viable within a semiconductor device or other manufacturing facility.

According to the present invention, an MES may interact with the inventive small lot Fab as if the small lot Fab is any other Fab component in an existing large lot Fab without requiring knowledge of how to control small lot Fab components (e.g., beyond specifying a processing recipe). In other words, a small lot Fab according to the present invention may encapsulate its internal use of small lot components and presents itself to the Fab's MES as if the small lot Fab were a component that uses large lot carriers (hereinafter referred to as a "large lot component").

Figure 1:
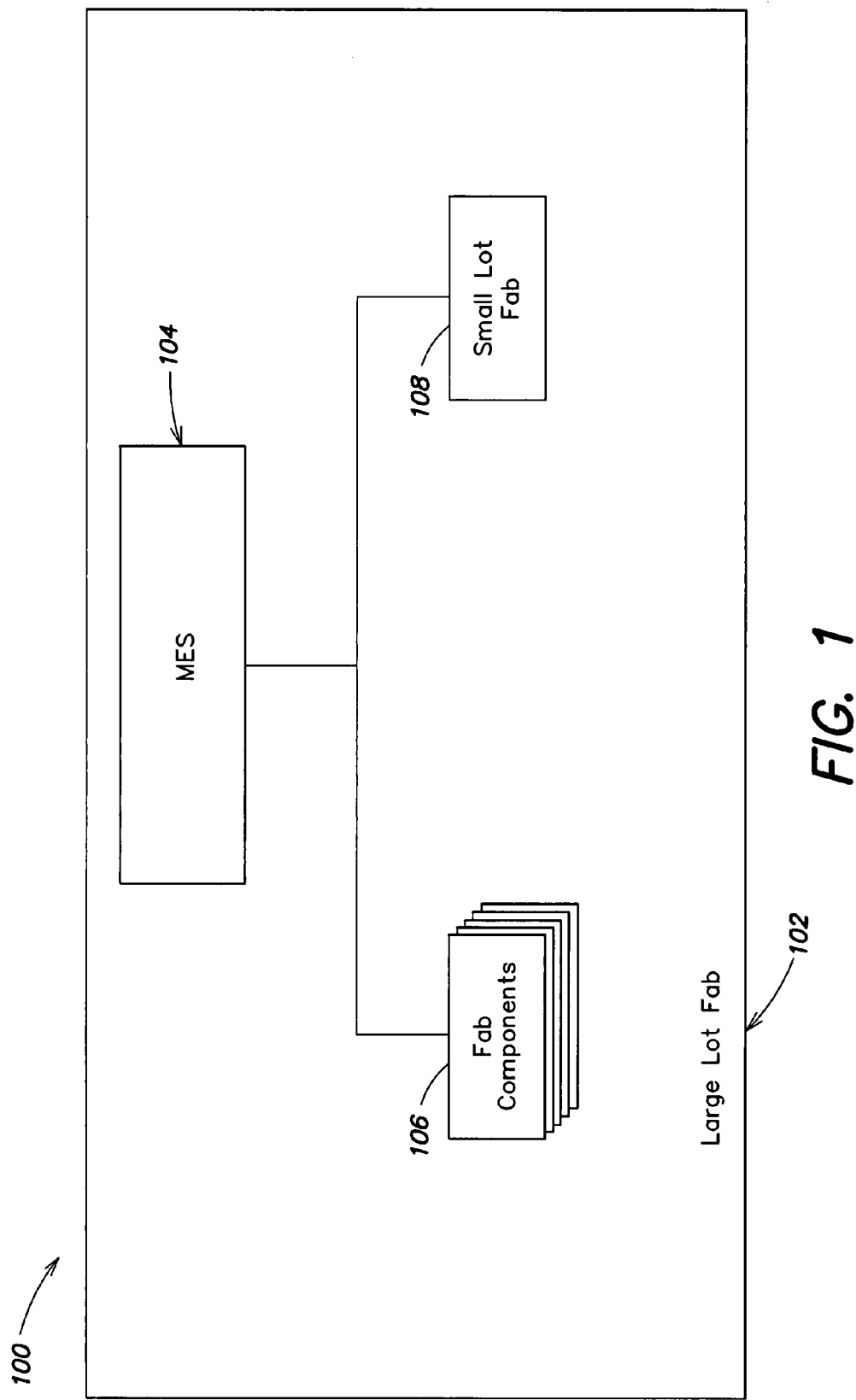
FIG. 1 is a block diagram depicting an example embodiment of a computer integrated manufacturing (CIM) software system architecture according to some embodiments of the present invention.

Turning to FIG. 1, a block diagram depicting an example embodiment of a distributed computer integrated manufacturing (CIM) software system architecture 100 according to some embodiments of the present invention is provided. The CIM software 100 may model operation of a physical Fab to track and control the physical components of the Fab. The CIM software 100 may include a representation of a large lot Fab 102 as an MES 104 that controls operation of a plurality of large lot Fab components 106, including a small lot Fab 108. In one or more embodiments of the invention, the small lot Fab 108 appears to the MES 104 as just another large lot Fab component 106.

To reduce the cycle time of a substrate processed in a Fab, electronic device manufacturers may attempt to transition to smaller lot sizes by reducing the number of substrates actually stored in a "large lot carrier" and/or by using smaller carriers (e.g., small lot carriers, medium-sized lot carriers, etc.). For example, manufacturers may try to reduce the number of substrates per carrier from twenty-five down to one. However, the inventors of the present invention have determined that a number of problems are created by attempting to operate a conventional Fab with one or only a few substrates per carrier. These problems include the limited ability of Fab tools to process one substrate or a few substrates per carrier without becoming "starved" for substrates, the lack of material handling systems in the Fab to support the storage and transport of the required higher number of carriers per hour, and manufacturing software's inability to track, schedule and move a significantly higher number of carriers in a Fab.

Thus, based on practical considerations, the inventors of the present invention have determined that the transition to smaller lot sizes is not likely to occur as a direct change from twenty-five to one substrate per carrier. It is anticipated that the transition will occur in a number of intermediate steps where the number of substrates in the carrier is reduced by some amount at each step.

In addition, while reducing the cycle time of an entire Fab is beneficial, reducing the cycle time at certain critical process and metrology steps (e.g., such as lithography processes) has a much higher return on investment (ROI) as compared to other steps in various processes typically applied to substrates. Therefore, it is anticipated that electronic device manufactures are more likely to implement lot size reduction for these high ROI processes first in their transition to using smaller lots throughout an entire Fab.

Thus, the present inventors anticipate that as Fabs transition to using smaller lot sizes, manufacturers will initially operate in a mode where different lot sizes are used in different parts of the Fab (e.g., in different bays or in different subsets of process steps in a larger process flow). It is anticipated that manufactures who implement Fabs that use different lot sizes will find that the different parts of the mixed lot size Fabs operate uniquely because of the difference in the lot sizes that are being processed. For example, mixed lot size Fabs typically use: material handling systems which operate differently (e.g., physically and/or logically); tools that have different behaviors in how they interact with the Fab in order to process material (e.g., requesting the Fab to load specific carriers rather than just any carrier); and operating/scheduling rules that are different.

The two trends discussed above (i.e., the use of smaller lot sizes and the use of different lot sizes in different parts of the Fab) will add significant complexity to Fabs if current industry practices are employed in implementing Fab CIM software. The complexity arises from the heterogeneous set of behaviors and rules by which various parts of the Fab will behave when processing substrate lots of different sizes. The heterogeneous nature of the behaviors and rules of a mixed lot size Fab results from the much larger number of carrier based transactions (e.g., between the various CIM components such as the MES, MCS, dispatcher/scheduler, and tools) that result from using smaller lot sizes. Further, since each time a carrier completes a process step and needs to be moved to the next step, information is moved via messages to the highest software layer (i.e., the MES), decisions are made at the highest layer, and then these decisions are propagated down through the layers as commands/requests. This centralized decision making model introduces latencies whose effect is compounded by the increased number of carrier based transactions accompanying the use of smaller lot sizes. The present inventors anticipate that the inability to effectively handle this complexity using prior art CIM software architectures will create a bottleneck in the transition to smaller lot sizes.

In some embodiments, the present invention solves the above described problems by partitioning the Fab CIM software 100 among the parts of the Fab that use different sized lots (e.g., a large lot Fab 102 and a small lot Fab 108) to facilitate the decentralization of the decision making process regarding what to do with a carrier (e.g., large or small) once it completes a process step. Decentralized control localizes the flow of information needed to make decisions rapidly and also encapsulates the rules and behavior differences within the relevant part of the Fab so as to isolate internal behavior of a given part from other parts of the Fab. For example, in the embodiment of FIG. 1, the internal behavior related to the movement of substrates within the small lot Fab 108 is encapsulated such that the MES 104 of large lot Fab 102 is not even aware of, much less required to have knowledge of, how the small lot Fab 108 delivers substrates to the various small lot tools within the small lot Fab 108.

Note that although only a single small lot Fab 108 is depicted in FIG. 1, any number of additional Fabs that each employ a lot size different than the large lot Fab 102 may also be implemented according to the present invention and thus, be similarly transparently integrated into the large lot Fab 102. For example, a single substrate sized carrier lot Fab (not pictured) and/or a medium sized carrier lot Fab (not pictured) may just as readily be integrated into the CIM software architecture 100 of the present invention.

As described above, at the highest level, the MES 104 views a small lot Fab 108 implemented according to the present invention just as any other tool in the factory. However, once a large lot carrier is delivered to such a small lot Fab 108 for processing, along with information specifying what processes to perform on the delivered substrates, the small lot Fab 108 removes the substrates from the large lot carrier and proceeds to schedule and manage the transport and processing of the substrates within the small lot Fab 108 based on its own business rules for executing the requested processes. Once all the substrates originally received in the large lot carrier have been processed, the processed substrates are returned to a large lot carrier (in some embodiments, to the same large lot carrier used to deliver the substrates, depending on the processing specifications provided for the carrier and the substrates by the MES 104) and control of the substrates is returned to the MES 104 of large lot Fab 102.

Figure 2:
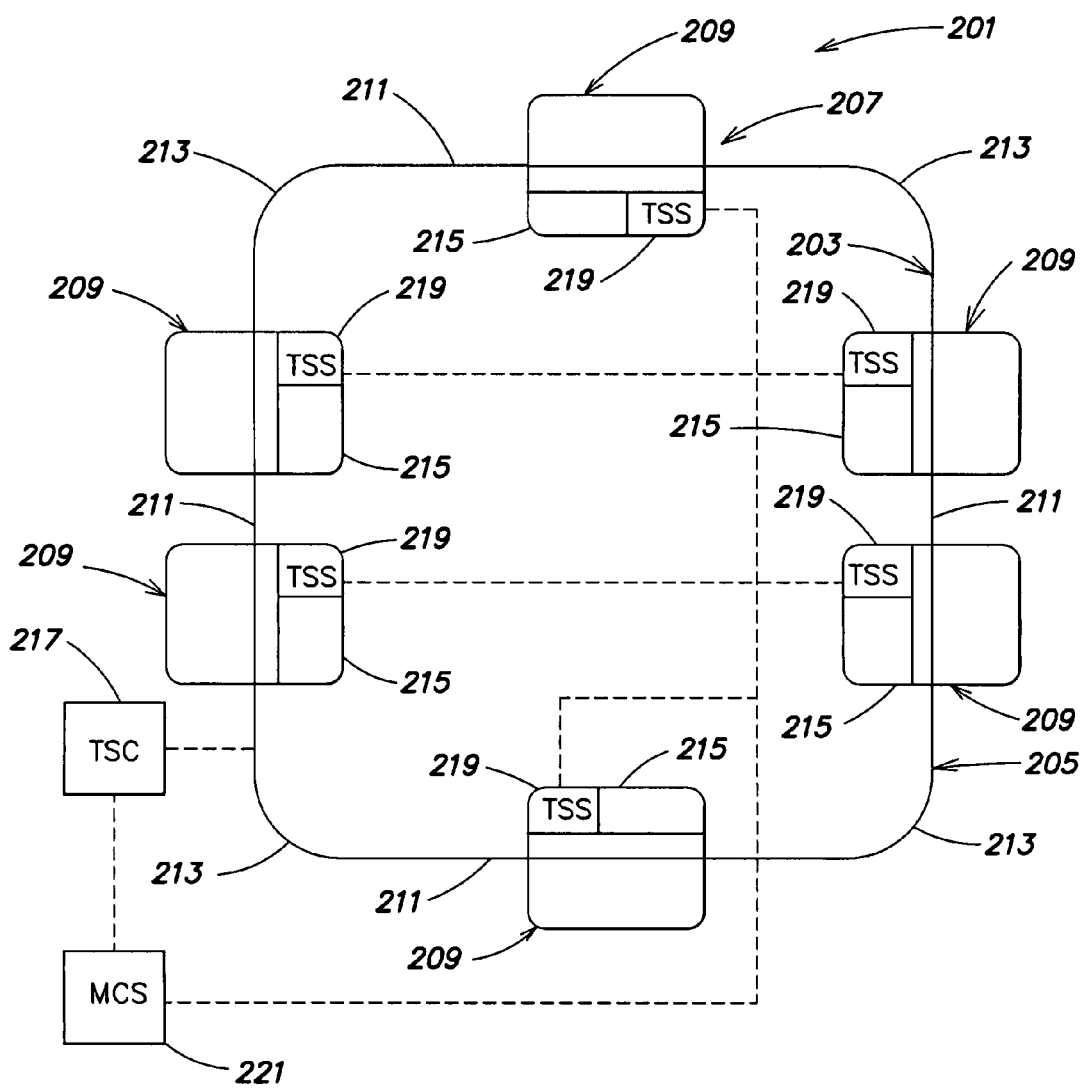
FIG. 2 is a schematic diagram depicting an example embodiment of a small lot carrier electronic device manufacturing system suitable for use in embodiments of the present invention.

Turning to FIG. 2, a schematic diagram is provided depicting an embodiment of a physical arrangement of an example Fab 201 that may form part of the small lot Fab 108 of FIG. 1 and that is especially well suited for using small lot size substrate carriers, such as substrate carriers that hold a single substrate or fewer than twenty-five substrates. The depicted small lot Fab 201 includes a high-speed transport system with several features that make it particularly suitable for using small lot carriers including: a high-speed, low maintenance, constantly moving conveyor system; a carrier loading/unloading function that does not require stopping or slowing the conveyor; a conveyor that is able to physically support many carriers at one time; and a flexible conveyor that may be readily customized to a desired transport path. These features are described further below.

Previously incorporated U.S. patent application Ser. No. 10/650,310, filed Aug. 28, 2003 and titled "System For Transporting Substrate Carriers", discloses a substrate carrier transport system or similar delivery system that includes a conveyor for substrate carriers that is intended to be constantly in motion during operation of the Fab which it serves. The constantly moving conveyor is intended to facilitate transportation of substrates within the Fab so as to reduce the total "dwell" time of each substrate in the Fab.

To operate a Fab in this manner, methods and apparatus should be provided for unloading substrate carriers from the conveyor, and for loading substrate carriers onto the conveyor, while the conveyor is in motion. Previously incorporated U.S. patent application Ser. No. 10/650,480, filed Aug. 28, 2003 and titled "Substrate Carrier Handler That Unloads Substrate Carriers Directly From a Moving Conveyor", discloses a substrate carrier handler at a substrate loading station or "tool station" that may perform such loading/unloading operations with respect to a moving conveyor. For example, a substrate loading station or tool station may include a horizontal guide or crane that is moveable vertically, and an end effector that is moveable horizontally along the horizontal guide. Other configurations for moving the end effector vertically and/or horizontally are provided.

To unload a substrate carrier from a moving conveyor that transfers substrate carriers (a "substrate carrier conveyor")

and that passes by the substrate loading station, the end effector is moved horizontally at a velocity that substantially matches the velocity of the substrate carrier as it is being transported by the substrate carrier conveyor (e.g., by substantially matching substrate carrier speed in a horizontal direction). In addition, the end effector may be maintained in a position adjacent the substrate carrier as the substrate carrier is being transported. The end effector thus may substantially match a position of the substrate carrier while substantially matching a velocity of the substrate carrier. Likewise, conveyor position and/or velocity may be substantially matched.

While the end effector substantially matches the substrate carrier's velocity (and/or position), the end effector is raised so that the end effector contacts the substrate carrier and disengages the substrate carrier from the substrate carrier conveyor. A substrate carrier similarly may be loaded onto the moving substrate carrier conveyor by substantially matching end effector and conveyor velocities (and/or positions) during loading. In at least one embodiment, such substrate carrier handoffs between the end effector and substrate carrier conveyor are performed at a substantially zero velocity and/or acceleration between the end effector and the substrate carrier.

Previously incorporated U.S. patent application Ser. No. 10/764,982, filed Jan. 26, 2004 and titled "Methods and Apparatus for Transporting Substrate Carriers", describes a conveyor system that may be employed with the above-described substrate carrier transport system and/or tool station for transporting substrate carriers between one or more processing tools of a electronic device manufacturing facility. The conveyor system may include a ribbon (or "band") that forms a closed loop within at least a portion of the electronic device manufacturing facility and that transports substrate carriers therein. In one or more embodiments, the ribbon or band may be formed from stainless steel, polycarbonate, composite materials (e.g., carbon graphite, fiberglass, etc.), steel or otherwise reinforced polyurethane, epoxy laminates, plastic or polymer materials that include stainless steel, fabric (e.g., carbon fiber, fiberglass, Kevlar® available from Dupont, polyethylene, steel mesh, etc.) or another stiffening material, etc. By orienting the ribbon so that a thick portion of the ribbon resides within a vertical plane and a thin portion of the ribbon resides within a horizontal plane, the ribbon is flexible in the horizontal plane and rigid in the vertical plane. Such a configuration allows the conveyor to be constructed and implemented inexpensively. For example, the ribbon requires little material to construct, is easy to fabricate and, due to its vertical rigidity/strength, can support the weight of numerous substrate carriers without supplemental support structure (such as rollers or other similar mechanisms used in conventional, horizontally-oriented belt-type conveyor systems). Furthermore, the conveyor system is highly customizable because the ribbon may be bent, bowed or otherwise shaped into numerous configurations due to its lateral flexibility.

The example small lot Fab 201 of FIG. 2 includes a ribbon or band 203 that forms a simple loop 205 within the small lot Fab 201. The ribbon 203 may comprise, for example, one of the ribbons described in previously incorporated U.S. patent application Ser. No. 10/764,982. The ribbon 203 transports substrate carriers (not shown) between processing tools 209, and comprises straight portions 211 and curved portions 213 to form the (closed) loop 205. Other number of processing tools 209 and/or loop configurations may be employed.

Each processing tool 209 may include a substrate carrier handler at a substrate loading station or "tool station" 215 of the processing tool 209 for unloading a substrate carrier from or for loading a substrate carrier onto the moving ribbon 203 of the conveyor system 207 as the ribbon 203 passes by the tool station 215 (as described in previously incorporated U.S. patent application Ser. No. 10/650,480). For example, an end effector (not separately shown) of a tool station 215 may be moved horizontally at a velocity that substantially matches the velocity of the substrate carrier as it is being transported by the ribbon 203, maintained in a position adjacent the substrate carrier as the substrate carrier is being transported and raised so that the end effector contacts the substrate carrier and disengages the substrate carrier from the conveyor system 207. A substrate carrier similarly may be loaded onto the moving ribbon 203 by substantially matching end effector and ribbon velocities (and/or positions) during loading.

Each tool station 215 may include one or more load ports or similar locations where substrates or substrate carriers are placed for transfer to and/or from a processing tool 209 (e.g., one or more docking stations, although transfer locations that do not employ docking/undocking movement may be employed). Various substrate carrier storage locations also may be provided at each tool station 215 for substrate carrier buffering at a processing tool 209.

The conveyor system 207 includes a transport system controller (TSC) 217 for controlling operation of the ribbon 203. For example the TSC 217 may control/monitor the speed and/or status of the ribbon 203, allocate cradles of the ribbon 203 that are used to support/transport substrate carriers, monitor the status of such cradles, provide such information to each tool station 215 or the like. Likewise, each tool station 215 may include tool station software (TSS) 219 for controlling tool station operation (e.g., loading or unloading of substrate carriers to/from the conveyor system 207, transporting of substrate carriers to/from load ports or storage locations of the tool station 215 and/or processing tool 209 serviced by the tool station 215, etc.). A material control system (MCS) 221 communicates with the transport system controller 217 and the tool station software 219 of each tool station 215 for affecting operation of the same. The TSC 217, each TSS 219 and/or the MCS 221 may include a scheduler (not shown) for controlling scheduling of the operations performed by the TSC 217, TSS 219 and/or the MCS 221.

Figure 3:
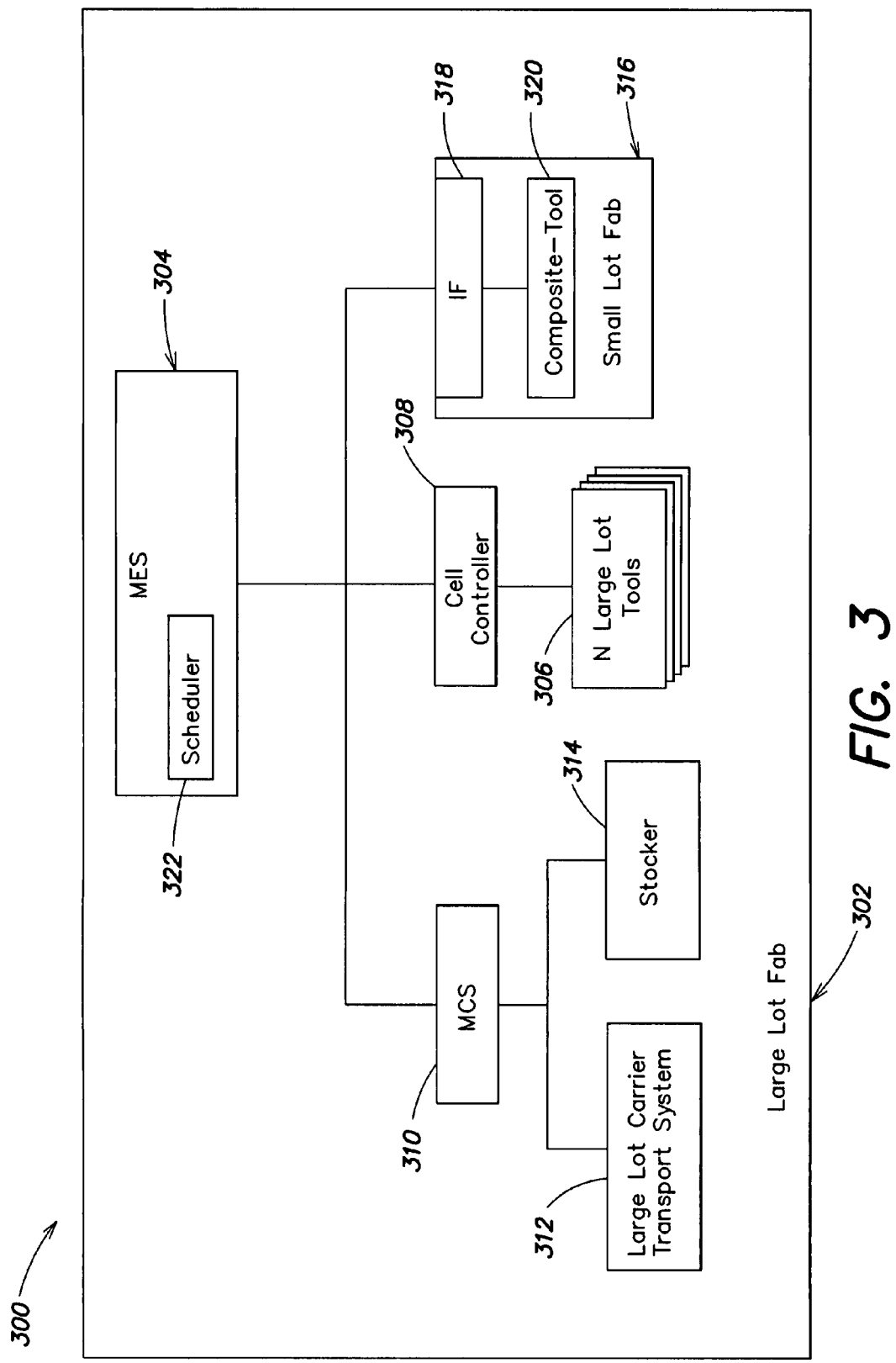
FIG. 3 is a block diagram depicting details of an example embodiment of a computer integrated manufacturing (CIM) software system architecture according to some embodiments of the present invention.

Turning to FIG. 3, a block diagram depicting details of an example embodiment of a CIM software system architecture 300 is provided. The CIM software 300 may include a model of a large lot Fab 302 represented as MES 304 that controls a plurality (N) of large lot tools 306, either directly or through an interface layer implemented as one or more cell controllers 308. Note that although one cell controller 308 is represented in FIG. 3, in some embodiments, there may be a cell controller for each tool 306 or group of tools, or no cell controllers at all. Physically, cell controller software may execute on one computer but logically each tool 306 may or may not have an associated cell controller. In other words, a tool 306 may include the functionality of a cell controller within the tool 306.

The MES 304 may also send requests to a MCS 310 to deliver carriers to and remove carriers from large lot tools 306. The MCS 310 in turn controls a large lot carrier transport system 312 to satisfy the MES's 304 requests. The large lot carrier transport system 312 may employ a stocker 314 to temporarily store carriers containing substrates waiting to be processed.

The MES 304 may also control a small lot Fab 316 in the sense that it may direct the small lot Fab 316 to perform processes on substrates delivered to the small lot Fab 316 in large lot carriers via the large lot carrier transport system 312 under the control of the MCS 310 in response to a request by the MES 304. However, in accordance with the present invention, the MES 304 does not control how the small lot Fab 316 manages the processes performed within the small lot Fab 316.

The small lot Fab 316 may include an interface 318 that allows a composite tool 320 to appear to be another large lot tool 306 to the MES 304. As will be explained in more detail below with respect to FIG. 4, a composite tool 320 may be embodied as a set of process and/or metrology tools and material transport systems (including high-speed transport systems) that can perform multiple process steps. For example, the physical small lot Fab 201 of FIG. 2 may represent an example of the components that a composite tool 320 may include. The interface 318 may be implemented to appear to the MES 304 as an additional cell controller 308 and thus, the composite tool 320 transparently integrates into the large lot Fab 302 by appearing to be a large lot tool to the MES 304. Note that in some embodiments, the interface 318 may be implemented within the composite tool 320. Thus, in some embodiments, a composite tool 320 and a small lot Fab 316 may be equivalent.

The MES 304 may also include a scheduler 322 for optimizing and coordinating operations of the Fab 302 components. In some embodiments, each of the MES 304, large lot tools 306, cell controller 308, MCS 310, large lot carrier transport system 312, stocker 314, small lot Fab 316, I/F 318, composite tool 320 may include a scheduler or scheduler component. Other numbers of MCS's, schedulers, cell controllers, large lot carrier transport systems, large lot tools, stockers, and small lot Fabs may be used.

Figure 4:
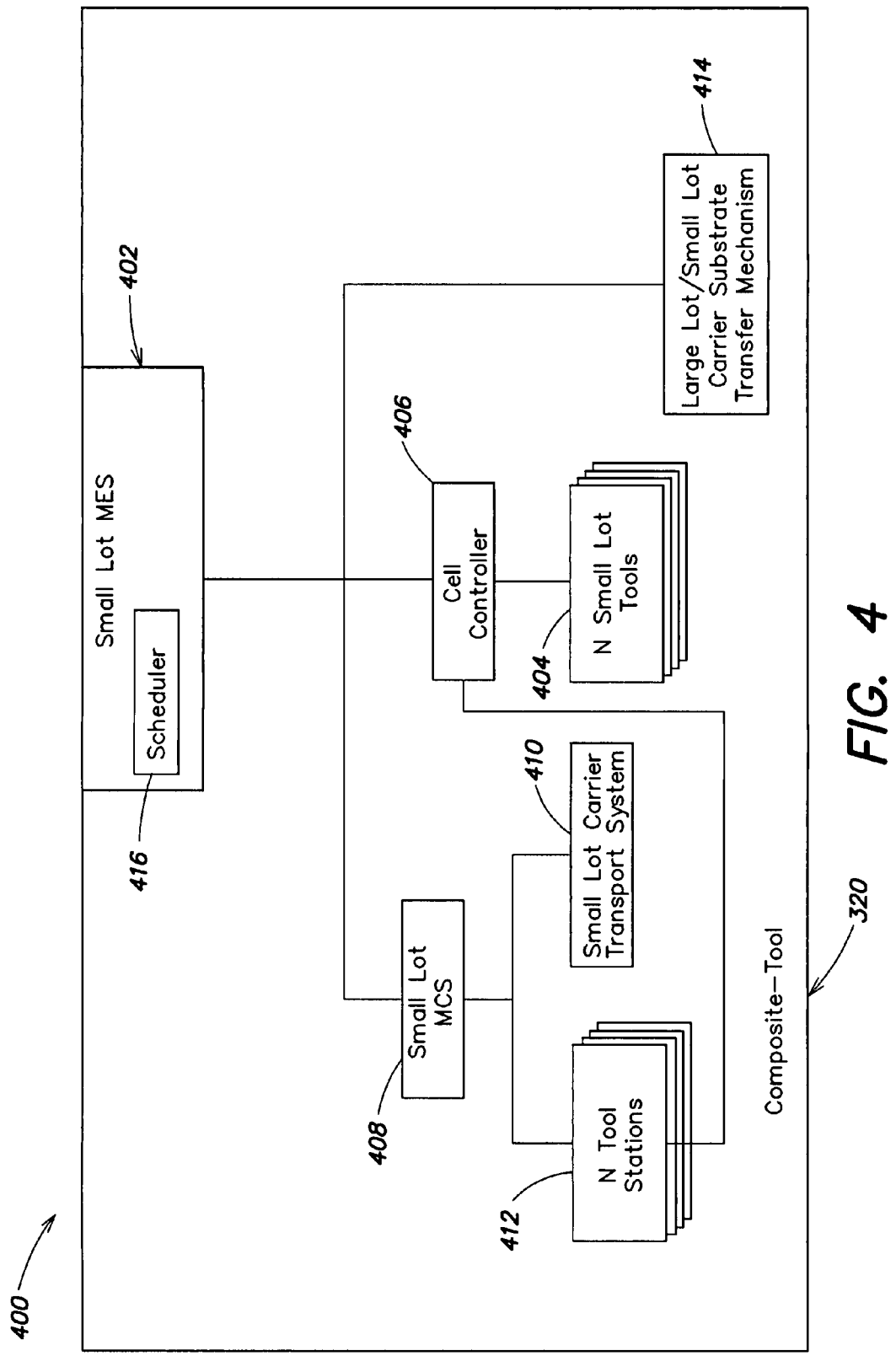
FIG. 4 is a block diagram depicting an example embodiment of a composite tool software architecture according to some embodiments of the present invention.

Turning to FIG. 4, a block diagram depicting an example embodiment of a composite tool software architecture 400 is provided. The composite tool 320 may be modeled as a small lot MES 402 that controls a plurality (N) of small lot tools 404 via an interface layer implemented as a cell controller 406. Note that although one cell controller 406 is represented in FIG. 4, in some embodiments, there may be a cell controller for each tool 404 or group of tools, or no cell controllers at all. Physically, cell controller software may execute on one computer but logically each tool 404 may or may not have an associated cell controller. In other words, a tool 404 may include the functionality of a cell controller within the tool 404.

The small lot MES 402 may also send requests to a small lot MCS 408 to deliver carriers to and remove carriers from small lot tools 404. The small lot MCS 408 in turn may control a small lot carrier transport system 410 and a plurality (N) of tool stations 412 (e.g., one located at each tool 404) to satisfy the small lot MES's 402 requests. As indicated above with respect to FIG. 2, each tool station 412 may load and unload substrate carriers to/from the small lot carrier transport system 410, transport substrate carriers to/from load ports or storage locations of the tool station 412 and/or tools 404 serviced by the tool station 412, and the like.

The small lot MES 402 may also control a large lot/small lot carrier substrate transfer mechanism 414. In some embodiments, the large lot/small lot carrier substrate transfer mechanism 414 may operate under the control of the small lot MCS 408. A large lot/small lot carrier substrate transfer mechanism 414 may be employed to receive a large lot carrier, unload "to-be-processed" substrates from the large lot carrier, and load these substrates into small lot carriers to be sent into the small lot Fab 316 (FIG. 3) for processing. Likewise, a large lot/small lot carrier substrate transfer mechanism 414 may also be employed to receive small lot carriers, unload processed substrates, and load these substrates into large lot carriers to be sent back out into the large lot Fab 302 (FIG. 3). Separate transfer mechanisms may be employed to transfer substrates from large lot carriers to small lot carriers and vice versa. Further, in some embodiments, such transfer mechanisms may be external to and/or separate from the small lot Fab 316. Other numbers of small lot MCS's cell controllers, transfer mechanisms, tool stations, small lot transfer systems, and/or small lot tools may be employed.

The MES 402 may also include a scheduler 416 for optimizing and coordinating operations of the composite tool 320 components. In some embodiments, each of the small lot MES 402, the small lot MCS 408, the small lot carrier transport system 410, each tool station 412, and/or the large lot/small lot carrier substrate transfer mechanism 414 may include a scheduler or scheduler component for controlling scheduling of the operations performed by the small lot MES 402, the small lot MCS 408, the small lot carrier transport system 410, each tool station 412, and/or the large lot/small lot carrier substrate transfer mechanism 414. In some embodiments, the small lot carrier transport system 410 may employ a stocker (not pictured) to temporarily store carriers containing substrates waiting to be processed.

Although not pictured, the composite tool 320 may additionally include a "different-sized" lot Fab that appears to the small lot MES 402 as just another small lot tool 404. In other words, in the same way the small lot Fab 108 transparently integrates into the large lot Fab 102, a different-sized lot Fab could be transparently integrated into the small lot Fab 108. Such nesting of composite tools within other composite tools may be implemented however deep as it may be useful to define sub-processes.

In operation, the composite tool 320 may receive substrates and a process recipe from the MES 304. Following its own business rules and independent of the rest of the components 106 of the large lot Fab 102, the small lot MES 402 takes control of the received substrates and executes the process recipe. Under the direction of the small lot MES 402, substrates are moved from one small lot tool 404 to the next based on a schedule that may not be made available outside the composite tool 320. If the small lot MES 402 encounters a problem or error condition, it may be operative to initiate whatever corrective action is necessary to resolve the problem without involving the MES 304. Thus, actual execution of the composite tool's processes and transport of substrates within the composite tool 320 is encapsulated from the rest of the Fab 102. This both simplifies the implementation of the Fab 102 by unburdening the MES 304 from the details of the composite tool's 320 operation and allows enhanced performance in support of the use of small lot carriers through decentralization (or localization) of decision making within the composite tool 320.

In some embodiments, the business rules within a composite tool 320 may be replicated, with appropriate and practicable adjustments, from business rules of the large lot Fab 102. For example, some of the business rules that govern the behavior of a scheduler/dispatcher 322 of a large lot FAB 102 may apply to a scheduler/dispatcher 416 of a composite tool 320. Other examples of rules that may be replicated include rules governing scheduling of preventative maintenance (PM) for tools, putting holds on tools for priority lots, determining the best tool or process chamber within which a lot should be processed (e.g., based on measurements made on some of the substrates within the lot or based on a history of within which tools and chambers the lot may have already been processed). Replication of business rules into nested composite tools may aid in the design and implementation of a Fab 102 in that generally applicable business rules may be reused and do not have to be recreated within each sub-composite tool.

To further reduce the latencies that result from using small lot carriers and because the internal operation of a composite tool 320 is encapsulated from the rest of the Fab 102, it is another advantage of the present invention that a composite tool 320 may be implemented with enhancements to prior art MES protocols without introducing incompatibilities. For example, in some embodiments, the small lot MES 402 may provide the small lot MCS 408 with several anticipated move instructions in advance of receiving actual "request to unload" status messages from tools 404. In other words, instead of waiting and reactively responding to status messages from tools 404 that would normally prompt the MES 402 to send move commands to the small lot MCS 408, the MES 402 may proactively send such commands. Using information from the scheduler 416, the small lot MES 402 may continually determine the most likely sequence of instructions that it anticipates that it would normally issue to the small lot MCS 408, for example, in the next n minutes, and continually send those instructions to the small lot MCS 408. Upon receipt, the small lot MCS 408 may queue the instructions so that a next instruction is immediately available. If, for example, a delay and/or an error condition alters the schedule, the small lot MES 402 or scheduler 416 may alert the small lot MCS 408 and the instruction queue may be flushed. By queuing instructions in this manner, delays may be avoided in situations where the small lot MES 402 is too busy to provide a next instruction when the small lot MCS 408 requires one and would otherwise have to enter a wait state that slows production.

In some embodiments, when processing of a small lot carrier's substrates completes at a tool 404, the tool's cell controller 406 (and/or the tool 404 itself) may provide a "request to unload" message to both the MES 402 and also directly to the tool's associated tool station 412. In prior art systems, an MCS will not unload a carrier from a tool until the MES and the scheduler have determined the next destination of the carrier (e.g., another tool or stocker) and then dispatched the determined destination to the MCS. This can lead to delays in the actual unloading of the carrier. However, according to embodiments of the present invention, by anticipating that a tool 404 will need a carrier unloaded (even if the carrier's next destination is not known) and queuing this instruction to the MCS 408, the tool station 412 will be able to unload the carrier as soon as the "request to unload" is provided to the tool station 412 directly from the cell controller 406 (or associated tool 404). This would result in the cell controller 406/tool 404 generating a "request to load" the next carrier faster. Support for this direct communication may be facilitated by communication paths between cell controllers 406 and associated tool stations 412 as shown in FIG. 4. Note that, although not pictured, in some embodiments, a communication path may link the tools 404 and the tools stations 412 directly.

Similar to the unload example described above, the MES 402 could also queue, to the MCS 408, the instructions for which next carrier needs to be loaded to a tool 404 prior to the "request for load" from the tool 404. Based on this knowledge prior to the request, the MCS 408 could pre-move the carrier to a tool's tool station 412 and the tool station 412 could load the carrier to the tool 404 as soon as the tool 404 requests the next carrier, without having to wait for the command from the MES 402.

Figure 5:
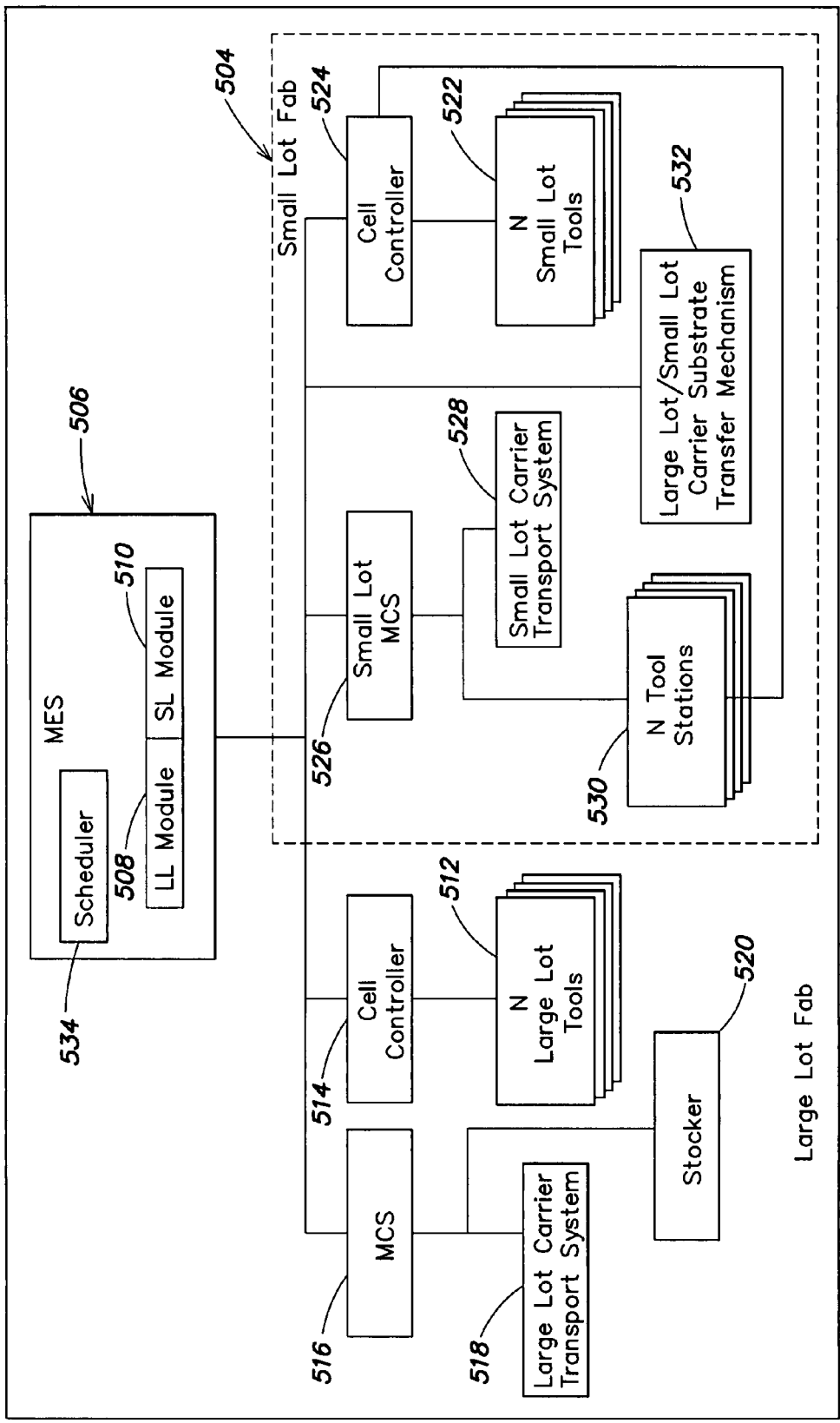
FIG. 5 is a block diagram depicting details of an example alternate embodiment of a computer integrated manufacturing (CIM) software system architecture according to some embodiments of the present invention.

Turning to FIG. 5, a block diagram is provided depicting details of an example alternate embodiment of a CIM software system architecture 500. The alternate embodiment depicted is of a centralized system that does not transparently integrate a small lot Fab into a large lot Fab as does the embodiments described above (e.g., the embodiment depicted in FIG. 3). However, using the instruction queuing feature described above, some of the latency problems with the pictured architecture may be overcome and some advantages of a centralized system may be realized.

A centralized CIM architecture 500 for a large lot Fab 502 that integrates a small lot Fab 504 is controlled by an MES 506 that includes both a large lot (LL) module 508 and a small lot (SL) module 510 for controlling the respective parts of the mixed lot size Fab of FIG. 5. The LL module 508 controls the plurality (N) of large lot tools 512 through an interface layer implemented as a cell controller 514. Note that although one cell controller 514 is represented in FIG. 5, in some embodiments, there may be a cell controller for each tool 512 or group of tools, or no cell controllers at all. Physically, cell controller software may execute on one computer but logically each tool 512 may or may not have an associated cell controller. In other words, a tool 512 may include the functionality of a cell controller within the tool 512.

The MES 506 via the LL module 508 may also send requests to an MCS 516 to deliver carriers to and remove carriers from large lot tools 512. The MCS 516 in turn controls a large lot carrier transport system 518 to satisfy the MES's 506 requests and uses one or more stockers 520 to temporarily store carriers containing substrates waiting to be processed. Other numbers of MES's, schedulers, modules, cell controllers, MCS's, large lot tools, large lot carrier transport systems, and stockers may be employed.

Via the SL module 510, the MES 506 also controls a plurality (N) of small lot tools 522 through an interface implemented as a second cell controller 524. The SL module 510 may also send requests to a small lot MCS 526 to deliver small lot carriers to and remove small lot carriers from small lot tools 522. The small lot MCS 526 in turn controls a small lot carrier transport system 528 and a plurality (N) of tool stations 530 (e.g., one located at each small lot tool 522) to satisfy the SL module's 510 requests. As indicated above with respect to FIG. 2, the tool stations 530 may load and unload substrate carriers to/from the small lot carrier transport system 528, transport substrate carriers to/from load ports or storage locations of the tool station 530 and/or tools 522 serviced by the tool station 530, and the like.

The SL module 510 may also control a large lot/small lot carrier substrate transfer mechanism 532. In some embodiments, the large lot/small lot carrier substrate transfer mechanism 532 may operate under the control of the small lot MCS 526 and/or the large lot MCS 516. A large lot/small lot carrier substrate transfer mechanism 532 may be employed to receive a large lot carrier, unload "to-be-processed" substrates from the large lot carrier, and load the substrates into small lot carriers to be sent to the small lot tools 522 of the small lot Fab 504 for processing. Likewise, a large lot/small lot carrier substrate transfer mechanism 532 may also be employed to receive small lot carriers, unload processed substrates, and load the substrates into large lot carriers to be sent back out into the large lot Fab 502.

The MES 506 may include a scheduler 534 for controlling scheduling of the operations performed by the Fab 502. In some embodiments, each of the MES 506, the large lot MCS 516, the small lot MCS 526, the large lot carrier transport system 518, the small lot carrier transport system 528, each tool station 530, and/or the large lot/small lot carrier substrate transfer mechanism 532 may include a scheduler (shown only in the MES 506) for controlling scheduling of the operations performed by each of the MES 506, the small lot MCS 526, the small lot carrier transport system 528, each tool station 530, and/or the large lot/small lot carrier substrate transfer mechanism 532.

In some embodiments, the small lot MCS 526 may employ a stocker (not pictured) to temporarily store carriers containing substrates waiting to be processed. Other numbers of MES's, large lot MCS's, small lot MCS's, large lot carrier transport systems, small lot carrier transport systems, tool stations, and/or large lot/small lot carrier substrate transfer mechanisms than those pictured or mentioned herein may be employed.

As indicated above, some latency problems that result from using small lot carriers may be overcome by queuing move and other instructions. In some embodiments, the MES 506, via the SL module 510, may provide the small lot MCS 526 with several move instructions in advance of an actual "request to unload" from a small lot tool 522. As described with respect to the composite tool 320 above, using information from the scheduler 534, the MES 506 may continually determine the most likely sequence of instructions that it anticipates that it would normally issue to the small lot MCS 526, for example, in the next n minutes, and continually send those instructions to the small lot MCS 526. Upon receipt, the small lot MCS 526 may queue the instructions so that a next instruction is immediately available. If, for example, a delay and/or an error condition alters the schedule, the MES 506 or scheduler 534 may alert the small lot MCS 526 and the instruction queue may be flushed. By queuing instructions in this manner, delays may be avoided in situations where the MES 506 is too busy to provide a next instruction at the time the small lot MCS 526 requires one and would otherwise have to enter a wait state that slows production. As with the composite tool 320 described above, communication paths between the cell controllers 524(and/or the small lot tools 522) and the associated tool stations 530 may be provided to allow the small lot MCS 526 to act in advance of receiving actual commands from the MES 506.

A benefit of a centralized system such as that depicted in FIG. 5, is that the MES 506 has more control and knowledge of all the components and workpieces in the Fab. In an implementation where the small lot process is relatively simple, the level of complexity and latency introduced into a centralized system by using small lots may be cost justified. However, with a more involved small lot Fab that is to be integrated into a large lot Fab, a decentralized, encapsulated, and transparently integrated composite tool may be preferred.

The foregoing description discloses only particular embodiments of the invention; modifications of the above disclosed methods and apparatus which fall within the scope of the invention will be readily apparent to those of ordinary skill in the art. For instance, although the examples provided above describe a small lot Fab 108 that includes only one carrier transport system 410, any number of carrier transport systems may be implemented in a small lot Fab 108. In small lot Fabs that do implement multiple carrier transport systems, transfer stations may be employed to facilitate moving a carrier from one carrier transport system to another.

It will be understood that the invention also may be employed with any type of substrates such as a silicon substrate, a glass plate, a mask, a reticule, etc., whether patterned or unpatterned; and/or with apparatus for transporting and/or processing such substrates.

Accordingly, while the present invention has been disclosed in connection with specific embodiments thereof, it should be understood that other embodiments may fall within the spirit and scope of the invention, as defined by the following claims.

The invention claimed is:

1. A fabrication system comprising:
    a large lot fabrication facility including:
        a first manufacturing execution system adapted for controlling transport and processing of large lot carriers;
        at least one large lot carrier system responsive to control instructions provided by the first manufacturing execution system and adapted to deliver large lot carriers to at least one large lot component and to a sub-system, the sub-system being adapted to utilize small lot carriers, wherein small lot carriers are adapted to hold a maximum of less than 10 substrates; and
        wherein the sub-system comprises: a second manufacturing execution system adapted for controlling transport and processing of small lot carriers within the sub-system;
    at least one component adapted for transporting or processing small lot carriers; and
    an interface coupled between the first manufacturing execution system and the second manufacturing execution system adapted to enable the subsystem to appear as a large lot component to the first manufacturing execution system.

2. The fabrication system of claim 1, wherein the sub-system further comprises:
    at least one transfer mechanism for transferring substrates from large lot carriers to small lot carriers;
    at least one small lot transport system coupled to the at least one transfer mechanism; and
    at least one small lot tool coupled to the small lot transport system and adapted to receive small lot carriers from the at least one small lot transport system.

3. The fabrication system of claim 2, wherein the sub-system further comprises:
    a small lot manufacturing control system coupled to the second manufacturing execution system and adapted to receive control instructions from the second manufacturing execution system and to control operation of the at least one small lot transport system.

4. The fabrication system of claim 2, wherein each of the at least one small lot tool includes a tool station adapted to receive small lot carriers from, or deliver small lot carriers to, the at least one small lot carrier transport system.

5. The fabrication system of claim 4, wherein the tool station includes local small lot carrier storage capacity.

6. A method comprising:
    incorporating a small lot fabrication facility adapted to utilize small lot carriers within a large lot fabrication facility having a large lot facility controller and at least one large lot component, wherein small lot carriers are adapted to hold a maximum of less than 10 substrates;
    insulating the small lot fabrication facility such that it appears as a large lot component to the large lot facility controller, wherein insulating comprises establishing an interface between the large lot facility controller and the small lot fabrication facility; and
    independently operating the small lot fabrication facility as insulated by the interface using a separate controller.

7. A method comprising:
    incorporating a small lot fabrication facility adapted to utilize small lot carriers within a large lot fabrication facility having a large lot facility controller and at least one large lot component, wherein small lot carriers are adapted to hold a maximum of less than 10 substrates;

insulating the small lot fabrication facility such that it appears as a large lot component to the large lot facility controller; and transferring substrates between large lot carriers suitable for the large lot fabrication facility and small lot carriers suitable for the small lot fabrication facility within the small lot fabrication facility.

8. A method of operating a large lot fabrication facility having at least one large lot component and a sub-system adapted to utilize small lot carriers, the method comprising:

centrally controlling delivery of large lot carriers to the at least one large lot component and to the subsystem adapted to utilize small lot carriers using first computer integrated manufacturing (CIM) software; and locally controlling delivery of small lot carriers within the sub-system using second computer integrated manufacturing (CIM) software;

wherein the sub-system is modeled as a large lot component using the first computer integrated manufacturing (CIM) software and wherein small lot carriers are adapted to hold a maximum of less than 13 substrates.

9. The method of claim 8, further comprising:

transferring substrates from large lot carriers to small lot carriers at the sub-system;

transporting small lot carriers within the sub-system; and receiving small lot carriers at a small lot tool.

10. The method of claim 9, wherein the second computer integrated manufacturing (CIM) software provides instructions for operating a small lot manufacturing control system adapted to receive control instructions from the second computer integrated manufacturing (CIM) software and to control operation of at least one small lot transport system.

11. The method of claim 10, further comprising:

receiving, at the small lot tool, small lot carriers from the at least one small lot carrier transport system.

12. The method of claim 10, further comprising:

delivering small lot carriers from the small lot tool to the at least one small lot carrier transport system.

13. The fabrication system of claim 12, further comprising:

storing small lot carriers at the small lot tool.

* * * * *